(12) United States Patent
Gautney et al.

(10) Patent No.: US 6,891,860 B2
(45) Date of Patent: May 10, 2005

(54) METHOD AND APPARATUS FOR ESTABLISHING MULTIPLE BANDWIDTH-LIMITED CONNECTIONS FOR A COMMUNICATION DEVICE

(75) Inventors: Charles W. Gautney, Germantown, MD (US); Nazmul Bin Idris, Reston, VA (US)

(73) Assignee: Defywire, Inc., Herndon, VA (US)

( * ) Notice: Subject to any disclaimer, the term of this patent is extended or adjusted under 35 U.S.C. 154(b) by 0 days.

(21) Appl. No.: 10/224,331

(22) Filed: Aug. 21, 2002

(65) Prior Publication Data

US 2004/0037240 A1 Feb. 26, 2004

(51) Int. Cl.[7] .................................................. H04J 1/02
(52) U.S. Cl. ........................................ 370/493; 370/352
(58) Field of Search ................................. 370/230, 352, 370/401, 493, 494, 329, 338, 349, 431, 475, 495; 709/203, 217, 218, 219

(56) References Cited

U.S. PATENT DOCUMENTS

| | | | |
|---|---|---|---|
| 5,754,864 A | | 5/1998 | Hill |
| 5,761,504 A | | 6/1998 | Corrigan et al. |
| 5,813,015 A | | 9/1998 | Pascoe |
| 5,835,724 A | * | 11/1998 | Smith .......................... 709/227 |
| 6,016,311 A | * | 1/2000 | Gilbert et al. ............... 370/280 |
| 6,032,227 A | | 2/2000 | Shaheen et al. |
| 6,065,120 A | * | 5/2000 | Laursen et al. ............. 713/201 |
| 6,148,405 A | * | 11/2000 | Liao et al. ................... 713/201 |
| 6,178,448 B1 | | 1/2001 | Gray et al. |
| 6,233,608 B1 | * | 5/2001 | Laursen et al. ............. 709/217 |
| 6,427,227 B1 | | 7/2002 | Chamberlain |
| 6,456,603 B1 | * | 9/2002 | Ismailov et al. ............ 370/310 |
| 6,460,076 B1 | | 10/2002 | Srinivasan |
| 6,480,957 B1 | * | 11/2002 | Liao et al. ................... 713/170 |
| 6,484,174 B1 | * | 11/2002 | Wall et al. ...................... 707/9 |
| 6,490,616 B1 | | 12/2002 | Maryka et al. |
| 6,490,624 B1 | * | 12/2002 | Sampson et al. ........... 709/227 |
| 6,532,225 B1 | * | 3/2003 | Chang et al. ............... 370/341 |
| 6,574,239 B1 | * | 6/2003 | Dowling et al. ............ 370/469 |
| 6,650,905 B1 | * | 11/2003 | Toskala et al. ............. 455/522 |
| 6,654,610 B1 | * | 11/2003 | Chen et al. ................. 455/450 |
| 2001/0006517 A1 | * | 7/2001 | Lin et al ..................... 370/348 |
| 2002/0062361 A1 | | 5/2002 | Kivipuro et al. |
| 2002/0065083 A1 | * | 5/2002 | Patel .......................... 455/452 |
| 2002/0083160 A1 | | 6/2002 | Middleton |
| 2003/0005427 A1 | | 1/2003 | Herrero |
| 2003/0032417 A1 | | 2/2003 | Minear et al. |
| 2003/0061273 A1 | | 3/2003 | Hayduk |
| 2003/0110190 A1 | | 6/2003 | Achiwa et al. |
| 2003/0217358 A1 | | 11/2003 | Thurston et al. |

* cited by examiner

*Primary Examiner*—John Pezzlo
*Assistant Examiner*—Donald L Mills
(74) *Attorney, Agent, or Firm*—Cooley Godward LLP

(57) ABSTRACT

A system and method is described for communicating with a communication device. An uplink connection uniquely associated with the communication device and uniquely associated with an uplink-session identifier is established. The uplink connection is a wireless connection. A downlink connection uniquely associated with the communication device and uniquely associated with a downlink-session identifier is established. The downlink connection is a wireless connection. A message from the communication device is received over the uplink connection within a time period. A message is sent to the communication device over the downlink connection within the time period.

17 Claims, 5 Drawing Sheets

| Username | Password | Gateway Address | Uplink-session Identifier | Downlink-session Identifier | Application-session identifier |
|---|---|---|---|---|---|
| jsmith | john | picotope.defywire.com ©1974 | 64 bit value (randomly generated) | 64 bit value (randomly generated) | .77CH67 |

METHOD AND APPARATUS FOR ESTABLISHING MULTIPLE BANDWIDTH-LIMITED CONNECTIONS FOR A COMMUNICATION DEVICE

CROSS-REFERENCE TO RELATED APPLICATIONS

This application is related to co-pending U.S. patent application Ser. No. 10/224,476, entitled "Method and Apparatus for Just-in-Time Provisioning Application-Related Information at a Communication Device;" and U.S. patent application Ser. No. 10/224,486, entitled "Method and Apparatus for Managing Resources Stored on a Communication Device;" all filed on the same day, the disclosures of which are incorporated herein by reference.

BACKGROUND

The invention relates generally to communication devices and communication systems. More specifically, the invention relates to a system and method for establishing multiple bandwidth-limited connections for a communication device such as, for example, separate uplink and downlink connections.

FIG. 1 shows a system block diagram of a known communication network. Communication device 100 is coupled to mobile network 110 by wireless connection 105. Mobile network 110 is coupled to gateway 120. Gateway 120 is also coupled to network 130, which is in turn coupled to network service A 140, network service B 150 and network service C 160. Network services 140, 150 and 160 can be, for example, storage devices storing content such as, for example, multimedia content in the form of an Internet site that is capable of being fetched by network service requests, or software applications that can receive instruction from a remote location such as an e-mail listing service.

Communication device 100 can be any type of appropriate communication device that is coupled to a mobile network 10 via a bandwidth-limited connection such as a wireless connection. Communication device 100 can be, for example, a wireless telephone, a wireless personal digital assistant (PDA), a wireless pager or any sort of hybrid wireless device that combines some or all their functionality. In other words, the communication device 100 can be any type of device that allows communications based on, for example, voice, data, text, graphics, animation, multimedia content or combinations thereof.

Gateway 120 can be any sort of appropriate gateway device or interface between a mobile network 110 and a different type of network such as a non-wireless network represented in FIG. 1 as network 130. Network 130 can include multiple types of networks such as the plain old telephone system (POTS), a data transmitting network or combinations thereof and can include additional types of gateways and other types of networks not shown.

In the known system configuration shown in FIG. 1, a single wireless connection is typically established between communication device 100 and mobile network 110. This wireless connection is shown as connection 105. Such a known wireless connection can allow communications other than voice-only communications. The known wireless connection can be configured, for example, using the Short Message Service (SMS) protocol or the Wireless Application Protocol (WAP).

The SMS protocol, for example, is a text-messaging service that uses the voice-based protocol of a network. The SMS protocol can support most wireless networks such as, for example, a Global System for Mobile Communications (GMS)-based network, a code-division multiple access (CDMA)-based network, or a time-division multiple access (TDMA)-based network. Regardless of the network configuration, the SMS protocol allows a text-messaging service over a single wireless connection between the communication device and the mobile network.

Similarly, the WAP protocol establishes a single connection between the communication device and the mobile network to allow communications other than voice-only communications. In particular, the WAP protocol is configured to operate at the Open System Interconnection (OSI) transport layer (i.e., information is exchanged and delivered between and within networks) rather than the network layer protocol. The WAP protocol is based on a request-response mechanism. Consequently, a request sent from a communication device 100 over wireless connection 105 to the mobile network 110 is received by a WAP-compatible gateway 120. The WAP-compatible gateway 120 then creates a fetch request compatible with network 130 and fetches the requested information, for example, from network service A 140. In this specific example based on the WAP protocol, network service A 140 is a web site that has content, which can be fetched by a request (also referred to herein as a fetch request) from communication device 100. Once the content from network service A 140 is fetched and forwarded through gateway 120, it is provided through the mobile network 110 and wireless connection 105 to communication device 100. Once the requested content is fetched and provided to communication device 100, the specific connection 105 is removed until the next fetch request occurs at which point in time a new communication connection 105 is established.

A fundamental limitation of such a WAP-based configuration is that when communication device 100 sends a fetch request over connection 105, additional fetch requests cannot be sent from communication device 100 until the response to the initial fetch request is received by communication device 100 over wireless connection 105. At this point in time, the connection is torn down. After the next fetch request is sent from communication device 100, a new connection is established specifically for that new fetch request.

Consequently, known protocols such as the SMS protocol and the WAP protocol are limited in either their ability to deliver more than just text-based messaging or their ability to provide multimedia content in more than a serial request-response manner. Thus, a need exists to provide better capabilities to communication devices connected to a network over a wireless connection.

SUMMARY OF THE INVENTION

A system and method for communicating with a communication device is described. An uplink connection uniquely associated with the communication device and uniquely associated with an uplink-session identifier is established. The uplink connection is a wireless connection. A downlink connection uniquely associated with the communication device and uniquely associated with a downlink-session identifier is established. The downlink connection is a wireless connection. A message from the communication device is received over the uplink connection within a time period. A message is sent to the communication device over the downlink connection within the time period.

BRIEF DESCRIPTION OF THE DRAWINGS

FIG. 4 shows an example of a database structure according an embodiment of the invention.

DETAILED DESCRIPTION

Figure 1:
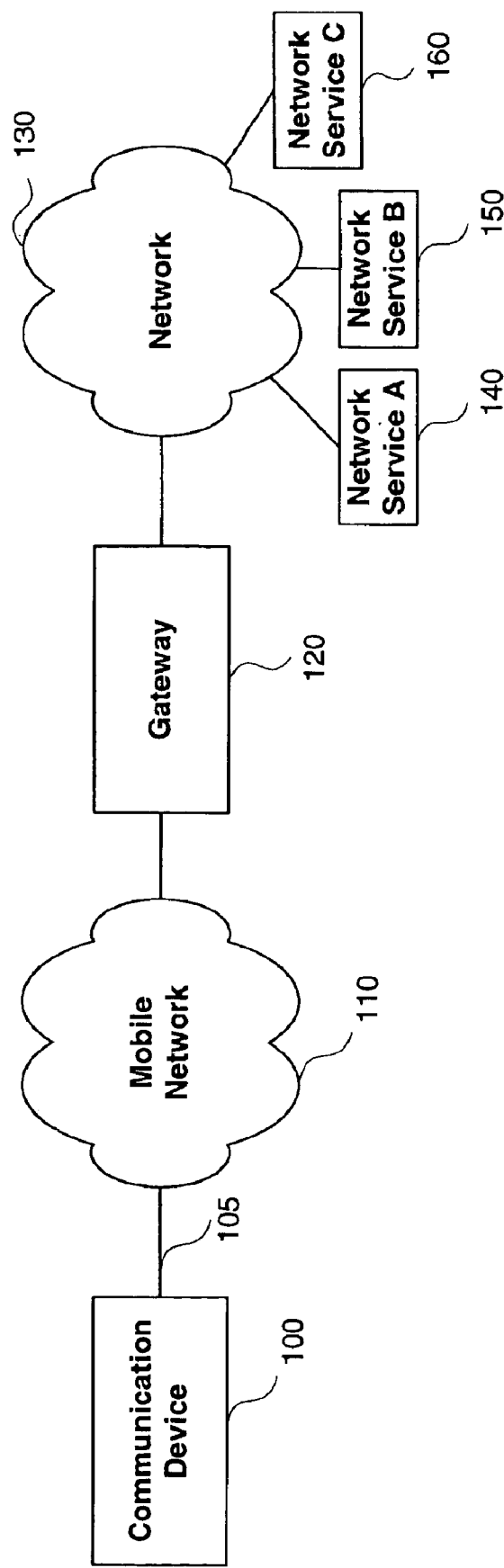
FIG. 1 shows a system block diagram of a known communication network.

The invention relates to establishing multiple bandwidth-limited connections for a communication device. Such bandwidth-limited connections can include, for example, separate uplink and downlink wireless connections for the communication device. These uplink and downlink connections can be uniquely associated with session identifiers, which are maintained for the duration of a session. Such uplink and downlink connections allow the communication device, for example, to send network service requests and receive responses to network service requests in parallel. In other words, multiple network service requests can be sent from the communication device without waiting for the responses. In addition, the responses to network service requests can be received in any order.

The term "bandwidth-limited connection" is used to include any type of connection where the bandwidth of the information desired to be transmitted exceeds the available bandwidth capacity of the connection. Such a bandwidth-limited connection can include, for example, a wireless data connection configured to send and/or receive multimedia content. The term "session" is used here to mean the operation of the communication device for a period of time, during at least a portion of which the communication device is in communication with the mobile network.

Connections with the communication device are "established" in the sense that the appropriate handshaking is performed. Thus, from the perspective of the communication device, connections with for example a mobile network are established in the sense that the communication device sends and receives the appropriate login requests and messages as needed. From the perspective of the mobile network or application server, connections with the communication device are established in the sense that the mobile network or application server receive and send the appropriate login requests and messages as needed. Connections involving the communication device can be established using, for example, encryption methods to provide the secure exchange of information.

The term "network service request" is used to mean any type of request or instruction sent from the communication device to another device via the mobile network. Similarly, the term "network service response" is used to mean any type of information provided in response to the network service request. For example, a network service request can be a request to a web site based on the http protocol. In this example, the content of the web site fetched from the web site based on the network service request is the network service response. Alternatively, a network service request can be, for example, an instruction to a software application. For example, the network service request can be an instruction to an e-mail list service, which can provide one or more future e-mails to the communication device based on the instruction. In this example, the future e-mail(s) is the network service response.

Figure 2:
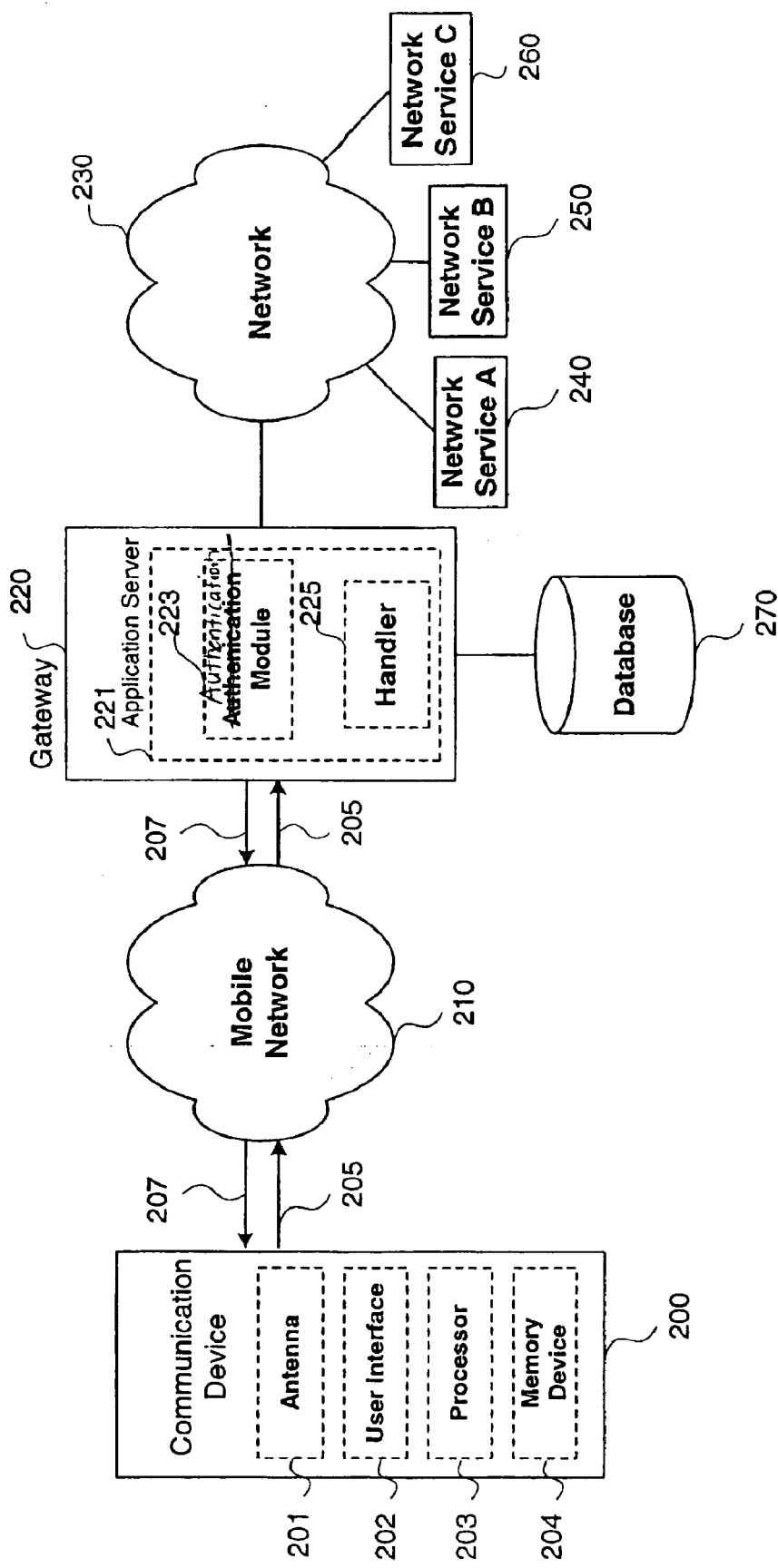
FIG. 2 shows a system block diagram of a communication network according to an embodiment of the invention.

FIG. 2 shows a system block diagram of a communication network according to an embodiment of the invention. Communication device 200 is coupled to gateway 220 through mobile network 210 by an uplink connection 205 and a downlink connection 207. Gateway 220 is coupled to network 230 and database 270. Network 230 is coupled to network service A 240, network service B 250 and network service C 260. Network services A 240, B 250 and C 260 can be any type of information stored at a network device that is remotely accessible. Such network services can be, for example, web-based multimedia content or a non-web-based software application.

Communication device 200 includes antenna 201, user interface 202, processor 203 and memory device 204. Gateway 220 includes application server 221, which includes authentication module 223 and handler 225. Application server 221 includes software configured to allow the functionality discussed below, including the functionality relating to the authentication module 223 and handler 225. Similarly, communication device 200 includes client-side software that is configured to operate with the software of application server 221. Note that although the software is described in terms of client and server software, any appropriate software configuration, such as distributed software, is possible.

The uplink connection 205 and downlink connection 207 are established for a particular communication device 200 for the duration of a session. In other words, once the communication device 200 is connected to the mobile network 210 via the uplink connection 205 and downlink connection 207, the session information associated with those connections is maintained during the duration of the session regardless of the particular status of the connections. Said another way, once a user enables communication device 200 to request connection to the mobile network 210 for a given session, the session information used to establish those uplink and downlink connections 205 and 207, respectively, are maintained for the session duration. After the user enables the communication device 200 to disable the connection, the session is over and session information for that session is no longer maintained. Consequently, if uplink and downlink connections 205 and 207, respectively, are temporarily inoperative due to, for example, environmental reasons or a topographical obstruction, once those connections can be reestablished within a given session, they are reestablished having the same associated session information.

Thus, when uplink and downlink connections 205 and 207, respectively, are established, they are established with particular session identifiers. For example, the uplink connection 205 can be established with an uplink-session identifier and the downlink connection 207 can be established with an associated downlink-session identifier. Consequently, if the connections become inoperative during the course of a session, they can be reestablished with the same respective session identifiers.

Although the uplink and downlink connections are discussed in reference to a distinctive uplink-session identifier and downlink session-identifier, many other embodiments are possible. For example, a particular uplink connection and downlink connection can be associated with the same session identifier. In this embodiment, the uplink-session identifier and downlink-session identifier can be the same for the duration of a particular session for that specific communication device. Thus, an uplink connection and a downlink connection can be uniquely associated with the same session identifier in the sense that the uplink connection is the only uplink connection associated with that session identifier and the downlink connection is the only downlink connection associated with that session identifier.

In another alternative embodiment, more than a single uplink connection and/or more than a single downlink connection can be established for a particular communication device. For example, it is possible to establish a single uplink connection and multiple downlink connections for a particular communication device such as a wireless PDA that has capability for receiving, storing and/or displaying high-bandwidth information content. In such a configuration, multiple downlink connections can be established to allow the transfer of high-bandwidth information content to the communication device. A single uplink connection may be appropriate to send low-bandwidth network service requests while multiple downlink connections allow the downloading of high-bandwidth information content. In such an embodiment, the uplink connection may be associated with a particular uplink-session identifier while the multiple downlink connections each can be associated its own downlink-session identifier. Alternatively, the single uplink connection and multiple downlink connections could all be associated with the same session identifier.

In summary, the session identifier(s) can be associated with a particular communication device for a particular session with two or more wireless connections, such as at least one uplink connection and at least one downlink connection.

Figure 3:
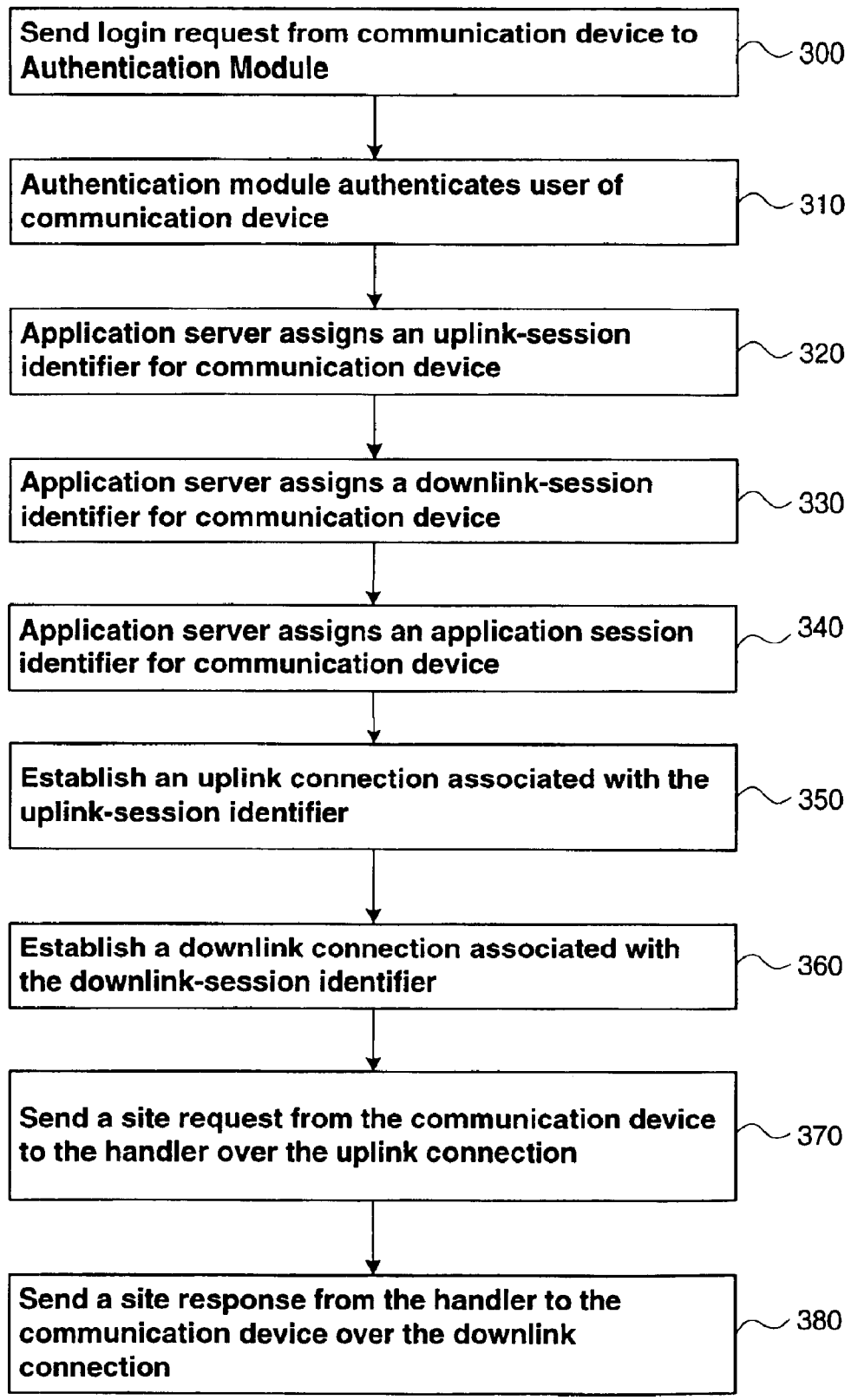
FIG. 3 shows a method for establishing communication with a communication device according to an embodiment of the invention.

FIG. 3 shows a method for establishing communication with a communication device according to an embodiment of the invention. At step 300, a login request is sent from communication device 200 to authentication module 223. The login request can include, for example, a user name, a password and a gateway address. The gateway address can identify the appropriate gateway or application server for this particular communication device. For example, the gateway address can identify a specific application server that is normally accessed by the communication device. Such an application server can, for example, store copies of the applications or data used for storage management of the communication device or used to provision the communication device. These two examples are described in pending U.S. patent application Ser. No. 10/224,476, entitled "Method and Apparatus for Just-in-Time Provisioning Application-Related Information at a Communication Device," and U.S. patent application Ser. No. 10/224,486, entitled "Method and Apparatus for Managing Resources Stored on a Communication Device," respectively, both of which are specifically incorporated here by reference.

At step 310, the authentication module 223 authenticates the user of communication device 200. This authentication can be performed, for example, through generally known encryption techniques. This authentication can be performed, for example, by comparing the user name, password and gateway address to a database having information obtained through service enrollment. Such a database can be store, for example, in database 270. FIG. 4 shows an example of a database structure according an embodiment of the invention.

As shown in FIG. 4, database record 400 can include the following fields: user name 410, password 420, gateway address 430, uplink-session identifier 440, downlink-session identifier 450 and application-session identifier 460. Database record 400 is shown in FIG. 4 with example values: user name 410 has a value "jsmith," password 420 has a value "john," and gateway address 430 has a value "pic-otop.defywire.com@ 1974." These values can be determined as part of an earlier enrollment process and then stored in database record 400. Consequently, upon receiving the login request for communication device, the authentication module 223 can compare the login request to the values stored in record 400 to confirm whether the user at communication device 200 is authorized.

At step 320, application server 221 assigns an uplink-session identifier associated with communication device 200 for this particular session. For example, the uplink-session identifier can be a randomly generated 64-bit number that is stored in uplink-session identifier 440 of database record 400. At step 330, application server 221 assigns a downlink-session identifier for communication device 200 for this particular session. This downlink-session identifier can be, for example, a 64-bit randomly generated number that is stored in downlink-session identifier 450 of database record 400. Although the uplink-session identifier and the downlink-session identifier are described by way of example as 64-bit randomly generated numbers, other configurations are possible such as for example session identifiers having different lengths or being non-randomly generated. The uplink-session identifier and downlink-session identifiers can be, for example, transmission control protocol/internet protocol (TCP/IP) network addresses that are assigned to communication device 200 for the duration of the session. As mentioned above, the uplink-session identifier and downlink session-identifier can be two distinctly different values each associated with its respective connection or, alternatively, can be the same value associated with both the uplink and downlink connections.

At step 340, an application-session identifier for communication device 200 can be assigned. The application-session identifier can be, for example, dynamically assigned. The application-session identifier can be a randomly generated value that is used internally for the application run by application server 221. Note that step 340 is an optional step and can be used as an administrative alternative to the network addresses that are typically much longer than a value for the application-session identifier 460. For example, the application-session identifier 460 is shown in FIG. 4 as having a value of "77CH67."

At step 350, an uplink connection 205 is established with communication device 200. The uplink connection 205 is associated with the value for uplink-session identifier 440. At step 360, a downlink connection 207 is established with communication device 200. The downlink connection 207 is associated with the value for downlink-session identifier 450.

Once the uplink and downlink connections 205 and 207, respectively, are established, the communication device 200 can perform appropriate communications with mobile network 210 as well as with network 230 through handler 225. For example, at step 370, a network service request from communication device 200 can be sent to mobile network 210 over uplink connection 205. Such a network service request, for example, can request content located at network service B 250. Such network service request is forwarded to handler 225, which translates the network service request into a format compatible with network 230 and network service B 250. Such a request can be, for example, a conventional fetch command for the world wide web. Based on this network service request, a network service response is forwarded from network service B 250 through network 230 to gateway 220. At step 380, the network service response is forwarded to communication device 200 over downlink connection 207 through mobile network 210.

Although the above example relates to network service requests and responses to the network service requests, other types of requests are possible. For example, the application server 221 can provide communication device 200 access to personal and/or enterprise data in real time, as well as run applications from a single central location. The application server 221 can thus provide access to other applications that can be operated on the communication device 200. Such other applications include, for example, instant messaging, order placement systems, field force automation, location-based services, e-mail calendar, news brokerage functions, and a variety of other personalized data types. Such other applications can be integrated with the application server 221 or can be located in separate locations within, for example, network 230 or even mobile network 210. Access to such other applications allows communications devices having, for example, limited memory or processing capabilities to operate applications remotely that could not be operated locally at the communication devices.

The method described in connection with FIGS. 3 and 4 can be implemented with any appropriate software that is compatible with communication device 200. For example, Java™ 2 Micro Edition (J2ME) is Sun Microsystem's version of Java™ configured for machines with limited hardware resources such as wireless phones, PDAs, and other consumer electronic and embedded devices. J2ME is configured to work with machines having as little as 128 KB of RAM and with processors much less powerful than those used on typical desktop and server machines. J2ME consists of a set of profiles each of which is defined for a particular type of device and consists of a minimum set of class libraries required for the particular type of device and a specification of a Java™ virtual machine required to support the device. Accordingly, the J2ME version of Java™ can be used to develop software that implements the methods discussed above in reference to FIGS. 3 and 4. For example, a portion of the software can reside on communication device 200 and a complimentary portion of the software can reside on gateway 220.

Figure 5:
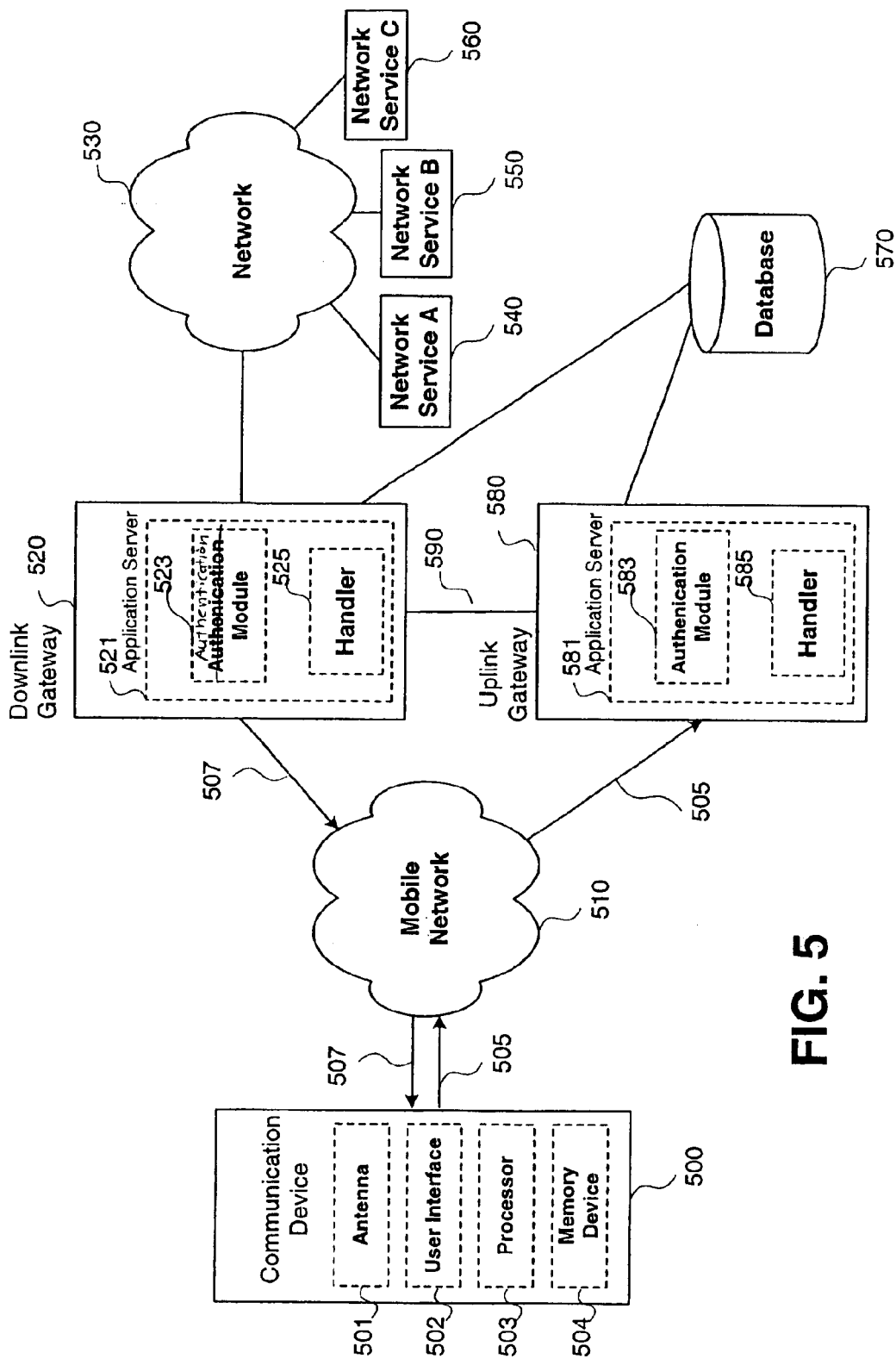
FIG. 5 shows a system block diagram of a communication network including distributed gateways, according to another embodiment of the invention.

FIG. 5 shows a system block diagram of a communication network including distributed gateways, according to another embodiment of the invention. Communication device 500 is coupled to gateway 580 through mobile network 510 by an uplink connection 505, and to gateway 520 through mobile network 510 by a downlink connection 507. Gateways 520 and 580 are connected to each other by connection 590. Gateways 520 and 580 are also separately connected to database 570. In addition, gateway 520 is coupled to network 530. Network 530 is coupled to network service A 540, network service B 550 and network service C 560. Communication device 500 includes antenna 501, user interface 502, processor 503 and memory device 504. Gateway 520 includes application server 521, which includes authentication module 523 and handler 525. Gateway 580 includes application server 581, which includes authentication module 583 and handler 585.

Application servers 521 and 581 each include software configured to allow the functionality discussed above, including the functionality relating to the authentication modules 523 and 583, and handlers 525 and 585, respectively. Similarly, communication device 500 includes client-side software that is configured to operate with the software of application servers 521 and 581. Note that although the software is described in terms of client and server software, any appropriate software configuration, such as distributed software, is possible.

The uplink connection 505 and downlink connection 507 are established for a particular communication device 500 for the duration of a session. This resulting session is similar to that described above in reference to FIG. 2. Here, however, the uplink connection 505 and the downlink connection 507 are established with distributed gateways: uplink gateway 580 and downlink gateway 520, respectively.

The uplink and downlink connections can be established in different ways. For example, the communication device 500 can send a login request to the uplink gateway 580. Based on the login request, the uplink gateway 580 can authenticate the user and assign an uplink session identifier associated with communication device 500 and uplink gateway 580. The uplink gateway 580 can also assign a downlink session identifier associated with the communication device 500 and downlink gateway 580.

The downlink session identifier can then be used to establish the downlink connection 507. For example, the downlink session identifier can be provided to downlink gateway 520 from uplink gateway 580 via connection 590. Based on the received downlink session identifier, the downlink connection 507 can be established between downlink gateway 520 and communication device 500. Alternatively, the downlink session identifier can be provided from the uplink gateway 580 to the communication device 500, which can then establish the downlink connection with downlink gateway 520 based on the downlink session identifier.

Although FIG. 5 shows a communication network with two distributed gateways, other configurations of distributed gateways are possible. For example, in embodiments where a communication device is associated with multiple downlink connections, these downlink connections can be distributed across multiple downlink gateways. For a specific example, where a communication device is associated with three downlink connections and three distributed downlink gateways, these three connections each can be uniquely associated with one of the three downlink gateways (each downlink connection being uniquely associated with one downlink gateway). Where a communication device is associated with three downlink connections and two distributed downlink gateways, two downlink connections can be associated with one downlink gateway and the remaining downlink connection can be associated with the remaining downlink gateway.

Similar to the above-described embodiments with multiple downlink connections and distributed downlink gateways, embodiments with multiple uplink connections and distributed uplink gateways are also possible. Alternatively, embodiments with both multiple downlink connections, and distributed downlink gateways, and multiple uplink connections and distributed uplink gateways are also possible.

CONCLUSION

While various embodiments of the invention have been described above, it should be understood that they have been presented by way of example only, and not limitation. Thus, the breadth and scope of the invention should not be limited by any of the above-described embodiments, but should be defined only in accordance with the following claims and their equivalents.

The previous description of the embodiments is provided to enable any person skilled in the art to make or use the present invention. While the invention has been particularly shown and described with reference to embodiments thereof, it will be understood by those skilled in the art that various changes in form and details may be made therein without departing from the spirit and scope of the invention. For example, although application server 221 is described above in reference to FIG. 2 as being located with the gateway 220, the application server and its related functionality can be located separate from the gateway 220. The application server and its related functionality can be, for example, a separate server coupled to network 230, mobile network 210 or distributed across multiple networks. In other words, the application server need not be co-located with the mobile-network gateway.

What is claimed is:

1. A processor-readable medium storing code representing instructions to cause a processor to perform a process, the code comprising code to:

establish an uplink connection uniquely associated with the communication device and uniquely associated with an uplink-session identifier, the uplink connection being a wireless connection;

establish a downlink connection uniquely associated with the communication device and uniquely associated with a downlink-session identifier, the downlink connection being a wireless connection;

send a message over the uplink connection within a time period;

receive a message over the downlink connection within the time period;

send a first network service request from the communication device over the uplink connection;

receive a network service response associated with the first network service request at the communication device over the downlink connection;

send a second network service request over the uplink connection, the code to send the second network service request being configured so that the second network service request is sent after sending the first network service request and before receiving the network service response associated with the first network service request; and receive a network service response associated with the second network service request over the downlink connection based on the second network service request, the code to receive the network service response associated with the second network service request being configured so that the network service response associated with the second network service request is received after sending the first network service request, after sending the second network service request and before receiving the network service response associated with the first network service request.

2. The processor-readable medium of claim 1, wherein the code further includes code to:

reestablish, after the uplink connection being temporarily inoperative, the uplink connection uniquely associated with the communication device and uniquely associated with the uplink-session identifier; and reestablish, after the downlink connection being temporarily inoperative, the downlink connection uniquely associated with the communication device and uniquely associated with the downlink-session identifier.

3. The processor-readable medium of claim 1, wherein:
the uplink-session identifier and the downlink-session identifier are unique within a plurality of session identifiers associated with a communication network to which the communication device is coupled.

4. The processor-readable medium of claim 1, wherein:
the uplink-session identifier and the downlink-session identifier are unique within a plurality of session identifiers associated with a service application.

5. The processor-readable medium of claim 1, wherein:
the network service response associated with the first network service request has at least a visual portion.

6. The processor-readable medium of claim 1, wherein:
the uplink-session identifier is a Transmission Control Protocol/Internet Protocol (TCP/IP) network address assigned to the communication device for the duration of the time period; and
the downlink-session identifier is a TCP/IP network address assigned to the communication device for the duration of the time period.

7. A method for communicating with a communication device, comprising:

establishing an uplink connection uniquely associated with the communication device and uniquely associated with an uplink-session identifier, the uplink connection being a wireless connection;

establishing a downlink connection uniquely associated with the communication device and uniquely associated with a downlink-session identifier, the downlink connection being a wireless connection;

receiving a first network service request from the communication device over the uplink connection;

sending a network service response associated with the first network service request to the communication device over the downlink connection;

receiving a second network service request from the communication device over the uplink connection, receiving the second network service request after receiving the first network service request and before sending the network service response associated with the first network service request; and sending a network service response associated with the second network service request to the communication device over the downlink connection based on the second network service request, sending the network service response associated with the second network service request after receiving the first network service request, after receiving the second network service request and before sending the network service response associated with the first network service request.

8. The method of claim 7, further comprising:

reestablishing, after the uplink connection being temporarily inoperative, the uplink connection uniquely associated with the communication device and uniquely associated with the uplink session identifier; and reestablishing, after the downlink connection being temporarily inoperative, the downlink connection uniquely associated with the communication device and uniquely associated with the downlink session identifier.

9. The method of claim 7, wherein:
the uplink-session identifier is a Transmission Control Protocol/Internet Protocol (TCP/IP) network address assigned to the communication device for a duration of the time period; and
the downlink-session identifier is a TCP/IP network address assigned to the communication device for the duration of the time period.

10. The method of claim 7, wherein:

the uplink-session identifier and the downlink-session identifier are unique within a plurality of session identifiers associated with a communication network to which the communication device is coupled.

11. The method of claim 7, wherein:

the uplink-session identifier and the downlink-session identifier are unique within a plurality of session identifiers associated with a service application.

12. The method of claim 7, further comprising:

receiving a login request from the communication device; and sending an authentication key to the communication device if the login request is authentic, the authentication key including the uplink-session identifier and the downlink-session identifier.

13. The method of claim 7, wherein:

the network service response associated with the first network service request has at least a visual portion.

14. A method for establishing a connection with a communication device, comprising:

receiving, during a session, a first network service request from the communication device over a first bandwidth-limited connection;

sending, during the session, a network service response associated with the first network service request to the communication device over a second bandwidth-limited connection;

receiving, during the session, a second network service request from the communication device over the first bandwidth-limited connection, receiving the second network service request after receiving the first network service request and before sending the network service response associated with the first network service request; and sending, during the session, a network service response associated with the second network service request to the communication device over the second bandwidth-limited connection based on the second network service request, sending the network service response associated with the second network service request after receiving the first network service request, after receiving the second network service request and before sending the network service response associated with the first network service request.

15. The method of claim 7, wherein the uplink connection and the downlink connection are active simultaneously.

16. The method of claim 7, wherein the uplink connection and the downlink connection are identical physical connections.

17. The method of claim 7, wherein the uplink connection and the downlink connection are different physical connections.

* * * * *